US012719776B2

(12) United States Patent
Tandur

(10) Patent No.: US 12,719,776 B2
(45) Date of Patent: Aug. 25, 2026

(54) IOT EDGE DEVICES UTILIZING MULTI-TRANSPORT MEDIUMS (BLUETOOTH MESH, WIFI MESH, CELLULAR) TO CONTROL DELAY AND JITTER

(71) Applicant: Hitachi Energy Ltd, Zürich (CH)

(72) Inventor: Deepaknath Tandur, Bangalore (IN)

(73) Assignee: HITACHI ENERGY LTD, Zurich (CH)

( * ) Notice: Subject to any disclaimer, the term of this patent is extended or adjusted under 35 U.S.C. 154(b) by 92 days.

(21) Appl. No.: 18/708,051

(22) PCT Filed: Nov. 25, 2022

(86) PCT No.: PCT/EP2022/083305

§ 371 (c)(1), (2) Date: May 7, 2024

(87) PCT Pub. No.: WO2023/094604

PCT Pub. Date: Jun. 1, 2023

(65) Prior Publication Data

US 2025/0300919 A1 Sep. 25, 2025

(30) Foreign Application Priority Data

Nov. 25, 2021 (IN) ............................. 202141054380
Jan. 13, 2022 (EP) .................................... 22151359

(51) Int. Cl.
*H04L 43/087* (2022.01)
*H04L 43/045* (2022.01)

(52) U.S. Cl.
CPC .......... *H04L 43/087* (2013.01); *H04L 43/045* (2013.01)

(58) Field of Classification Search
None
See application file for complete search history.

(56) References Cited

U.S. PATENT DOCUMENTS 6,094,728 A * 7/2000 Ichikawa .............. G06F 3/0689 714/E11.034
6,421,284 B1 * 7/2002 Sakata ................. G11C 29/785 365/200

(Continued)

FOREIGN PATENT DOCUMENTS

CN 107864084 A 3/2018
JP 2008-515348 A 5/2008
JP 2012-191251 A 10/2012

OTHER PUBLICATIONS

Kuhn, "Application layer jitter control based on building of jitter profiles over 4G IoT connections", ip.com, ip.com Inc:, West Henrietta, NY, US, Apr. 26, 2021, ISSN: 1533-0001, 8 pages.

(Continued)

*Primary Examiner* — Ranodhi Serrao
(74) *Attorney, Agent, or Firm* — PROCOPIO, CORY, HARGREAVES & SAVITCH LLP

(57) ABSTRACT

An apparatus comprising at least one integrated circuit configured to cause the apparatus to: determine delay information and/or jitter information for a first plurality of data units in a first data transmission, the first plurality of data units in the first transmission being received by a receiving device via different connections from a transmitting device; in dependence on the determined delay information and/or jitter information for the first plurality of data units, determine for a second transmission of a second plurality of data units, which one or more of the second plurality of data units is to provide redundant data, the second transmission to be received by the receiving device via the different connections between the transmitting device and the receiving device; and cause information about which one or more of the second plurality of data units is to provide redundant data, to be provided to the transmitter.

16 Claims, 7 Drawing Sheets

(56) References Cited

U.S. PATENT DOCUMENTS 7,020,472 B2 3/2006 Schmidt
7,904,744 B2 * 3/2011 Oikawa .................. G06F 3/061 370/220
7,929,543 B2 * 4/2011 Miyata .................... H04L 12/66 370/428
8,868,998 B2 * 10/2014 Okuno .................. H04L 1/1858 709/224
9,337,838 B2 * 5/2016 Saen .................. H03K 19/0075
9,354,915 B2 * 5/2016 Kano .................. H04L 67/1097
10,805,196 B2 * 10/2020 Mani ..................... H04W 24/08
10,869,213 B2 * 12/2020 Shi ........................ H04L 1/1685
10,945,021 B2 * 3/2021 Iguchi ................ H04N 21/8451
10,999,012 B2 * 5/2021 Ho .................... H03M 13/6547
2006/0072555 A1 4/2006 Hilaire et al.
2008/0219281 A1 9/2008 Akin et al.
2008/0244098 A1 * 10/2008 Oikawa ................. G06F 3/0661 710/5
2008/0267090 A1 * 10/2008 Okita ...................... H04L 12/66 370/254
2008/0267184 A1 10/2008 Arisoylu et al.
2011/0125943 A1 * 5/2011 Oikawa ............... G06F 11/0727 710/106
2011/0170555 A1 * 7/2011 Miyata .................... H04L 12/66 370/401
2013/0100968 A1 * 4/2013 Vafin ..................... H04L 1/0018 370/517
2013/0159806 A1 * 6/2013 Okuno .................. H04L 1/1858 714/749
2013/0239150 A1 9/2013 Chen et al.
2014/0032727 A1 * 1/2014 Kano .................... H04L 49/552 709/223
2015/0281288 A1 10/2015 Levinson et al.
2016/0127215 A1 * 5/2016 Mani ..................... H04L 1/0002 370/252
2017/0026278 A1 * 1/2017 Tsutsumi ............ H04L 41/0677
2017/0359611 A1 * 12/2017 Iguchi ................ H04N 21/2381
2018/0102870 A1 4/2018 Hassan
2019/0104079 A1 4/2019 Wang
2019/0200251 A1 * 6/2019 Shi ........................ H04L 1/1614
2021/0152873 A1 * 5/2021 Iguchi ................ H04N 21/2343
2021/0266103 A1 * 8/2021 Ho ....................... H03M 13/611
2022/0166542 A1 * 5/2022 Ho ........................ H04L 1/0045

OTHER PUBLICATIONS

Beritelli et al., “A cellular bonding and adaptive load balancing based multi-sim gateway for mobile ad hoc and sensor networks”, International Journal on AdHoc Networking Systems (IJANS) vol. 5, No. 3, Jul. 2015, DOI : 10.5121/ijans.2015.5301, 15 pages.

Schmidt et al., “A first look at multi-access connectivity for mobile networking”, CSWS’12, Dec. 10, 2012, Nice, France, 6 pages.

Viprinet Europe Gmbh, “Always online wherever and whenever needed”, 2014, 6 pages.

Jurca, “Forward Error Correction for Multipath Media Streaming”, ISSN 1051-8215—Sep. 2009, IEEE Transactions on circuits and systems for video technology, vol. 19, No., 9, pp. 1315-1326.

Kurn, “Joint jitter and delay control mechanism for multiple transport interface based IoT devices”, IP.com, Apr. 20, 2021, 4 pages.

Kousa et al., “Multichannel adaptive system”, IEEE, Oct. 1993, vol. 140, No. 5, 8049i IEE Proceedings-I, Stevenage, Herts, GB, pp. 357-364.

Chen et al., “Robust Video Streaming Over Wireless LANs Using Multiple Description Transcoding and Prioritized Retransmission”, Journal of Visual Communication and Image Representation—2007, pp. 191-206.

Bächli et al., “Teleprotection solutions with guaranteed performance using packet switched wide area communication networks”, 6 pages.

Sahu et al., “Traffic splitting for end-to-end delay jitter control in uplink multi-access systems”, 2019 11th International Conference on Communication Systems & Networks (COMSNETS), 978-1-5386-7902-9/19/$31.00 © 2019 IEEE, pp. 231-238.

So et al., “Wireless interface bonding supporting in-order delivery and automatic load balancing”, IEEE Journals & Magazine, https://ieeexplore.ieee.org/document/7572945, Feb. 19, 2021, 7 pages.

* cited by examiner

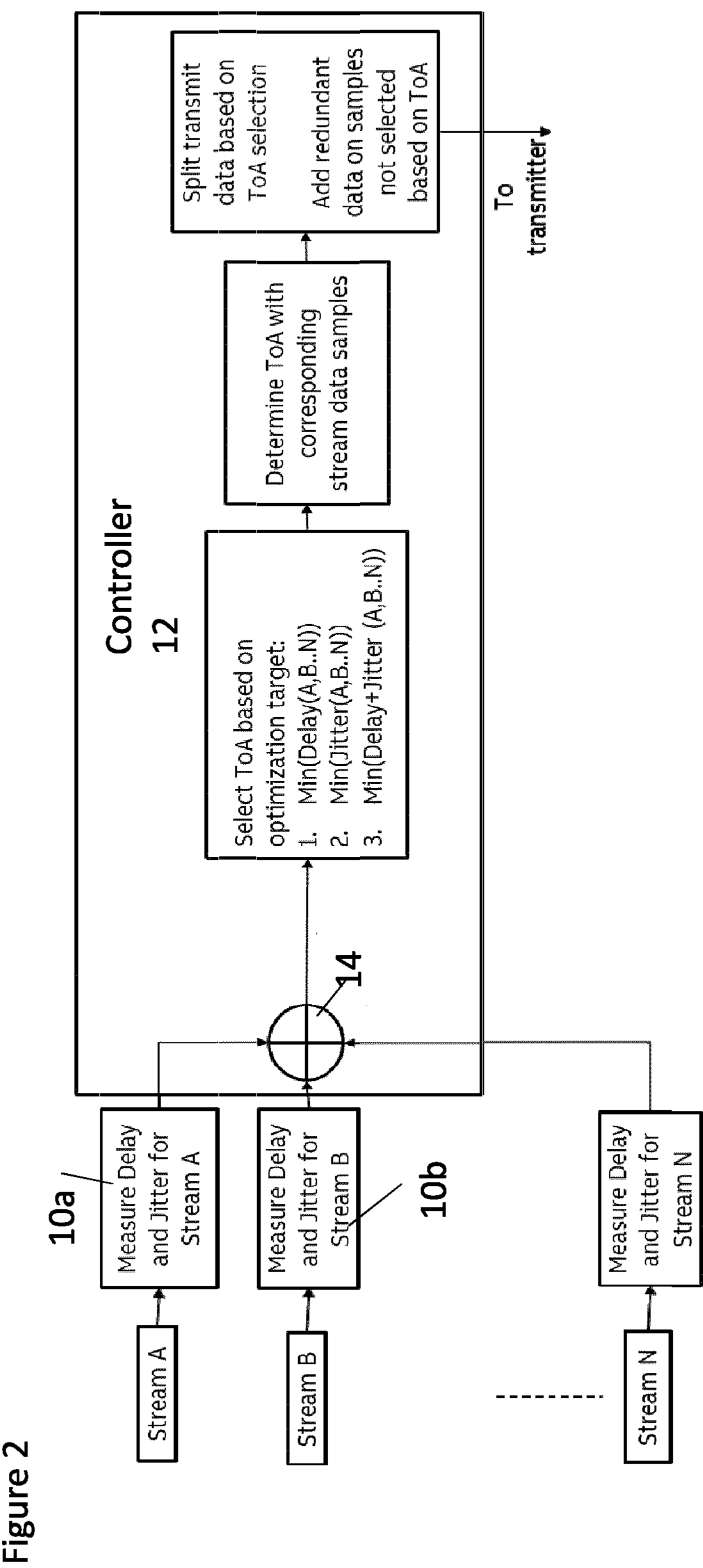
Figure 2
Stream A
Stream B
Stream N
Measure Delay and Jitter for Stream A
Measure Delay and Jitter for Stream B
Measure Delay and Jitter for Stream N
10a
10b
14
Controller 12
Select ToA based on optimization target:
1. Min(Delay(A,B..N))
2. Min(Jitter(A,B..N))
3. Min(Delay+Jitter (A,B..N))
Determine ToA with corresponding stream data samples
Split transmit data based on ToA selection
Add redundant data on samples not selected based on ToA
To transmitter A1 Determining delay information and/or jitter information for a first plurality of data units in a first data transmission, the first plurality of data units in the first transmission being received by a receiving device via a plurality of different connections from a transmitting device A2 In dependence on the determined delay information and/or jitter information for the first plurality of data units, determining for a second transmission of a second plurality of data units, which one or more of the second plurality of data units is to provide redundant data, the second transmission to be received by the receiving device via the plurality of different connections between the transmitting device and the receiving device, the second transmission being subsequent to the first transmission A3 Causing information, about which one or more of the second plurality of data units is to provide redundant data, to be provided to the transmitter

Figure 7:
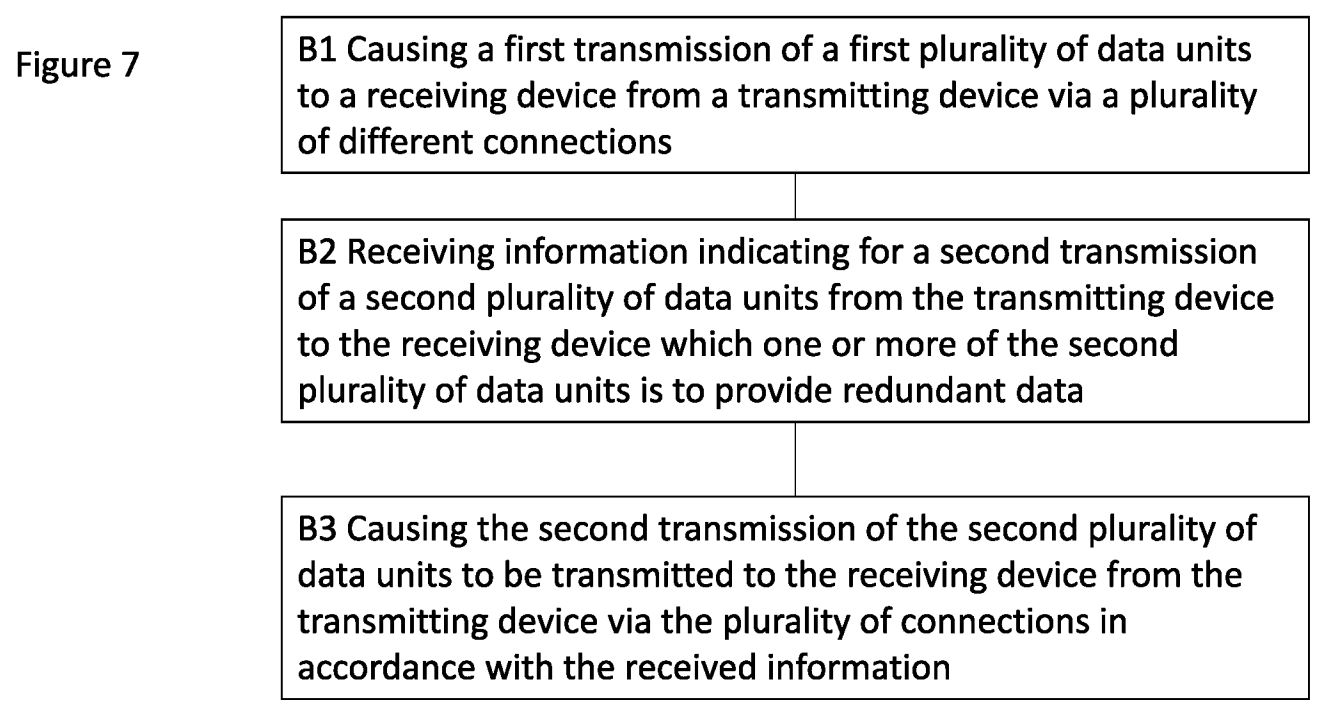

B1 Causing a first transmission of a first plurality of data units to a receiving device from a transmitting device via a plurality of different connections B2 Receiving information indicating for a second transmission of a second plurality of data units from the transmitting device to the receiving device which one or more of the second plurality of data units is to provide redundant data B3 Causing the second transmission of the second plurality of data units to be transmitted to the receiving device from the transmitting device via the plurality of connections in accordance with the received information

IOT EDGE DEVICES UTILIZING MULTI-TRANSPORT MEDIUMS (BLUETOOTH MESH, WIFI MESH, CELLULAR) TO CONTROL DELAY AND JITTER

CROSS-REFERENCE TO RELATED APPLICATIONS

The present application is a national stage entry of International Patent Application No. PCT/EP2022/083305, filed on Nov. 25, 2022, which claims priority to Indian Patent Application number 202141054380, filed on Nov. 25, 2021, and European Patent Application No. 22151359.1, filed on Jan. 13, 2022, which are all hereby incorporated herein by reference as if set forth in full.

TECHNICAL FIELD

The present disclosure relates to methods and apparatus and, in particular, but not exclusively to methods and apparatus for controlling the transmission of data between a receiving device and a transmitting device.

BACKGROUND

Some communication devices have more than one connectivity interface. One example of such communication devices comprise IoT (internet of things) devices. Simultaneously utilizing multiple connectivity options at an IoT edge may be used to improving the raw bandwidth or improving the redundancy at the end device. However there may be problems in that the connection with the IoT device may experience a varying delay and jitter performance over time. As such, such connections may not be suitable, for example, for industrial applications using industrial application devices which may work on very low data rate connections. Delay and jitter control within the required limit may be one of the performance characteristics for enabling industrial applications.

It is an aim of some embodiments to address or at least mitigate the above described problems.

SUMMARY

According to an aspect, there is provided an apparatus, the apparatus comprising at least one integrated circuit configured to cause the apparatus to: determine delay information and/or jitter information for a first plurality of data units in a first data transmission, the first plurality of data units in the first transmission being received by a receiving device via a plurality of different connections from a transmitting device; in dependence on the determined delay information and/or jitter information for the first plurality of data units, determine for a second transmission of a second plurality of data units, which one or more of the second plurality of data units is to provide redundant data, the second transmission to be received by the receiving device via the plurality of different connections between the transmitting device and the receiving device, the second transmission being subsequent to the first transmission; and cause information about which one or more of the second plurality of data units is to provide redundant data, to be provided to the transmitter.

Some embodiments may provide a solution which may optimize and limit both jitter and delay within a defined specification for a respective application.

Further embodiments and aspects of the apparatus may further address one or more of above described problems.

The at least one integrated circuit may be configured to determine delay information and/or jitter information for the first plurality of data units in the first data transmission based on an order in which the first plurality of data units are received.

The at least one integrated circuit may be configured to cause the apparatus to determine for each data unit of the first plurality of data units of the first transmission, when that data unit was received at the receiving device.

The at least one integrated circuit may be configured to cause the apparatus to determine for the second transmission which one or more of the second plurality of data units is to provide redundant data to provide a reduced delay, a reduced jitter or a reduced jitter and delay compared to that of the first plurality of data units of the first transmission.

This may be achieved by an optimization process or function.

The at least one integrated circuit may be configured to cause the apparatus to determine when each of the first plurality of data units of the first transmission are received with respect to a common time reference The at least one integrated circuit may be configured to cause the apparatus to determine that the one or more of delay and jitter targets are unable to be achieved for the second transmission using the plurality of connections.

The at least one integrated circuit may be configured to cause the apparatus to determine that one or more of a delay target and a jitter target are unable to be achieved for the second transmission, and in response, provide an indication of this to a user interface.

The at least one integrated circuit may be configured to cause the apparatus to determine that one or more delay and jitter targets are unable to be achieved for the second transmission using the plurality of different connections used for the first transmission, and in response, determine one or more additional connections to be used with the plurality of different connections for the second transmission.

The at least one integrated circuit may be configured to cause the apparatus to determine for the second transmission received at the receiver, a quality of service metric for one or more connections used for the second transmission, and in response to determining a decline in a respective quality of service metric for a respective connection providing an indication of this to a user interface.

The at least one integrated circuit may be configured to cause the apparatus to determine for the second transmission received at the receiver, a quality of service metric for one or more connections used for the second transmission, and in response to determining a decline in a respective quality of service metric for a respective connection of the plurality of connections used for the second transmission, causing the transmitting device to remove the respective connection from the plurality of connections used for transmission of data units of the second transmission.

The at least one integrated circuit may be configured to cause the apparatus to determine as the delay information a delay deviation representing an amount by which the delay deviates from a reference delay value.

The at least one integrated circuit may be configured to cause the apparatus to determine as the jitter information a jitter deviation representing an amount by which the jitter deviates from a reference jitter value.

The data units may be packets.

The at least one integrated circuit may be configured to cause the apparatus to determine delay information and/or jitter information for the first plurality of data units of the first transmission for each of the plurality of different connections.

The one or more the plurality of different connections is provided by one or more of: a Bluetooth connection; a Wi-Fi connection; an Ethernet connection; an optical connection; and a mobile communication connection.

The first plurality of data units of the first transmission and the second plurality of data units of the second transmission may be associated with one or more of: an internet of things application; an industrial application; a protection application; a distance protection application; a differential protection application; a factory application; a substation application; an automation application; a substation automation application; and a factory automation application.

The apparatus may be a receiving device or provided in a receiving device.

According to another aspect, there is provided an apparatus comprising at least one integrated circuit configured to cause the apparatus to: cause a first transmission of a first plurality of data units to a receiving device from a transmitting device via a plurality of different connections; receive information indicating for a second transmission of a second plurality of data units from the transmitting device to the receiving device which one or more of the second plurality of data units is to provide redundant data; and cause the second transmission of the second plurality of data units to be transmitted to the receiving device from the transmitting device via the plurality of different connections in accordance with the received information.

The at least one integrated circuit may be configured to cause the apparatus to receive information from the receiving device indicating one or more additional connections to be added to one or more used for the second transmission.

The at least one integrated circuit may be configured to cause the apparatus to receive information from the receiving device indicating that one or more connections are to be removed from one or more connections used for the second transmission.

The data units may be packets.

The one or more the plurality of different connections is provided by one or more of: a Bluetooth connection; a Wi-Fi connection; an Ethernet connection; an optical connection; and a mobile communication connection.

The first plurality of data units of the first transmission and the second plurality of data units of the second transmission may be associated with one or more of: an internet of things application; an industrial application; a protection application; a distance protection application; a differential protection application; a factory application; a substation application; an automation application; a substation automation application; and a factory automation application.

The apparatus may be a transmitting device or provided in a transmitting device.

According to an aspect, there is provided a method comprising: determining delay information and/or jitter information for a first plurality of data units in a first data transmission, the first plurality of data units in the first transmission being received by a receiving device via a plurality of different connections from a transmitting device; in dependence on the determined delay information and/or jitter information for the plurality of data units, determining for a second transmission of a second plurality of data units, which one or more of the second plurality of data units is to provide redundant data, the second transmission to be received by the receiving device via the plurality of different connections between the transmitting device and the receiving device, the second transmission being subsequent to the first transmission; and causing information, about which one or more of the second plurality of data units is to provide redundant data to be provided to the transmitter.

Some embodiments may provide a solution which may optimize and limit both jitter and delay within a defined specification for a respective application.

Further embodiments and aspects of said method may further address one or more of above described problems.

The method may comprise determining delay information and/or jitter information for the first plurality of data units in the first data transmission based on an order in which the first plurality of data units are received.

The method may comprise determining determine for each data unit of the first plurality of data units of the first transmission, when that data unit was received at the receiving device.

The method may comprise determining for the second transmission which one or more of the second plurality of data units is to provide redundant data to provide a reduced delay, a reduced jitter or a reduced jitter and delay compared to that of the first plurality of data units of the first transmission.

This may be achieved by an optimization process or function.

The method may comprise determining when each of the first plurality of data units of the first transmission are received with respect to a common time reference The method may comprise determining that the one or more of delay and jitter targets are unable to be achieved for the second transmission using the plurality of connections.

The method may comprise determining that one or more of a delay target and a jitter target are unable to be achieved for the second transmission, and in response, providing an indication of this to a user interface.

The method may comprise, determining that one or more delay and jitter targets are unable to be achieved for the second transmission using the plurality of different connections used for the first transmission, and in response, determining one or more additional connections to be used with the plurality of different connections for the second transmission.

The method may comprise determining for the second transmission received at the receiver, a quality of service metric for one or more connections used for the second transmission, and in response to determining a decline in a respective quality of service metric for a respective connection providing an indication of this to a user interface.

The method may comprise determining for the second transmission received at the receiver, a quality of service metric for one or more connections used for the second transmission, and in response to determining a decline in a respective quality of service metric for a respective connection of the plurality of connections used for the second transmission, causing the transmitting device to remove the respective connection from the plurality of connections used for transmission of data units of the second transmission.

The method may comprise determining as the delay information a delay deviation representing an amount by which the delay deviates from a reference delay value.

The method may comprise determining as the jitter information a jitter deviation representing an amount by which the jitter deviates from a reference jitter value.

The data units may be packets.

The method may comprise determining delay information and/or jitter information for the first plurality of data units of the first transmission for each of the plurality of different connections.

The one or more the plurality of different connections is provided by one or more of: a Bluetooth connection; a Wi-Fi connection; an Ethernet connection; an optical connection; and a mobile communication connection.

The first plurality of data units of the first transmission and the second plurality of data units of the second transmission may be associated with one or more of: an internet of things application; an industrial application; a protection application; a distance protection application; a differential protection application; a factory application; a substation application; an automation application; a substation automation application; and a factory automation application.

The method may be performed by an apparatus. The apparatus may be a receiving device or provided in a receiving device.

According to another aspect, there is provided a method comprising: causing a first transmission of a first plurality of data units to a receiving device from a transmitting device via a plurality of different connections; receiving information indicating for a second transmission of a second plurality of data units from the transmitting device to the receiving device which one or more of the second plurality of data units is to provide redundant data; and causing the second transmission of the second plurality of data units to be transmitted to the receiving device from the transmitting device via the plurality of different connections in accordance with the received information.

The method may comprise receiving information from the receiving device indicating one or more additional connections to be added to the one or more connections used for the second transmission.

The method may comprise receiving information from the receiving device indicating that one or more connections are to be removed from the one or more connections used for the second transmission.

The one or more the plurality of different connections is provided by one or more of: a Bluetooth connection; a Wi-Fi connection; an Ethernet connection; an optical connection; and a mobile communication connection.

The first plurality of data units of the first transmission and the second plurality of data units of the second transmission may be associated with one or more of: an internet of things application; an industrial application; a protection application; a distance protection application; a differential protection application; a factory application; a substation application; an automation application; a substation automation application; and a factory automation application.

The data units may be packets.

The method may be performed by an apparatus. The apparatus may be a transmitting device or provided in a transmitting device.

According to an aspect, there is provided a computer readable medium comprising program instructions for causing an apparatus to perform at least the method according to any of the preceding aspects.

According to an aspect, there is provided a non-transitory computer readable medium comprising program instructions for causing an apparatus to perform at least the method according to any of the preceding aspects.

In the above, many different embodiments have been described. It should be appreciated that further embodiments may be provided by the combination of any two or more of the embodiments described above.

BRIEF DESCRIPTION OF THE DRAWINGS

One or more examples are now described, by way of example only, with reference to the accompanying figures in which:

FIG. 2 schematically shows a method of some embodiments;

FIG. 6 shows a method of some embodiments; and

FIG. 7 shows another method of some embodiments.

DETAILED DESCRIPTION

Some embodiments provide a jitter and/or delay control for a transmitting device. The transmitting device may be any suitable device capable of transmitting to a receiving device.

The transmitting device may be an IoT device, an IoT edge device, machine communication device or any other suitable computing device which requires communication with another device. Some embodiments may be used with transmitting devices which have more than one connectivity interface and/or a connectivity interface supporting a plurality of communication protocols. The connectivity interface can be any suitable connectivity interface. The connectivity interface may use a transport medium protocol. Some examples of a transport medium protocol supported by one or more connectivity interfaces of some embodiments may comprise one or more of Bluetooth, Wi-Fi, Wi-Fi mesh, Ethernet, optical connection, mobile communication connection and/or the like. The mobile communication connection can be any suitable connection based on 5G, LTE-A, 4G, 3G, and/or the like. The Bluetooth protocol may be Bluetooth 5 or any other Bluetooth protocol.

In some embodiments two or more connectivity interfaces may use the same transport medium protocol. In some embodiments, two or more connectivity interfaces may use different transport medium protocols.

The interfaces of the transmitting device may belong to any transport access medium with one or more connections.

Figure 1:
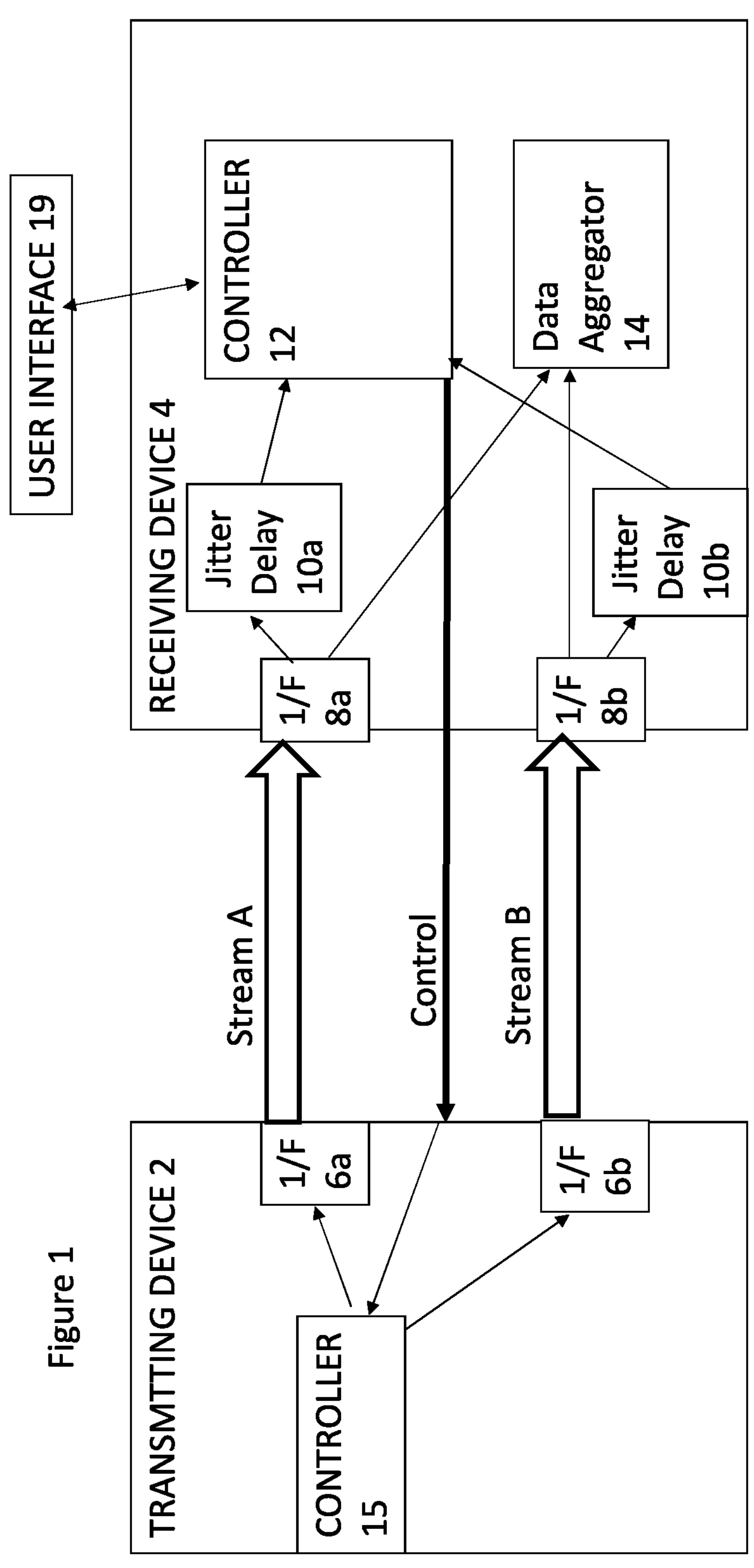
FIG. 1 schematically shows a transmitting device and a receiving device.

Reference is made to FIG. 1 which schematically shows a transmitting device 2 and a receiving device 4. By way of example only, the transmitting device of FIG. 1 comprises a first connectivity interface 6*a* and a second connectivity interface 6*b*. The transmitting device may in some embodiments be provided with two or more than two connectivity interfaces. The transmitting device may in some embodiments be provided with one connectivity interface supporting two or more separate connections.

The receiving device has a first connectivity interface 8*a* and a second connectivity interface 8*b*. The first connectivity interface 8*a* of the receiving device may receive a first stream, stream A from the first connectivity interface 6*a* of the transmitting device. The second connectivity interface 8*b* of the receiving device may receive a second stream, stream B from the second connectivity interface 6*b* of the transmitting device.

The receiving device may in some embodiments be provided with two or more than two connectivity interfaces. The receiving device may in some embodiments be provided with one connectivity interface supporting two or more separate connections.

It should be noted that there are one or more transport media between the receiving and transmitting devices. Different streams may be transported between the transmitting device and the receiving device via the same or different transport media.

In some embodiments, there may be one or more intermediate node devices between the transmitting device and the receiving device.

Some embodiments may perform the analytics related to jitter control, delay control or jitter and delay control, as required, at the receiving device 4. This may avoid the need to modify the communication protocols. The receiving device 4 may be configured to provide control only for delay, only for jitter or for both jitter and delay. In the example of FIG. 1, the receiving device 4 is configured to determine the jitter and delay of the first and second streams. This is determined by a jitter and delay determining function 10*a* for the stream A and a jitter and delay determining function 10*b* for stream A. The circuitry providing the jitter and delay determining function 10*a* may also provide the jitter and delay determining function 10*b*. Alternatively separate circuitry may provide the jitter and delay determining function 10*a* as compared to the circuitry providing the jitter and delay determining function 10*b*.

The jitter and delay data determined by jitter and delay determining functions are then provided as input to a controller 12 of the receiving device. In some embodiments, the receiving device 4 is configured to provide the transmitting device with control feedback which is determined by the controller 12. This feedback may provide information on the interfaces to be utilized by the transmitting device. This feedback may alternatively or additionally provide information on the required data pattern to be utilized by the transmitting device.

The transmitting device 2 is configured to use the control feedback. The transmitting device 2 has a controller 15 which controls the data which is transmitted on each stream. The controller 15 will receive the control feedback. The controller 15 may in response to this feedback control the transmitting of the data over the two or more interfaces. The feedback may be used to add redundancy.

The feedback provided may be dependent on the application of the transmitting device and/or the receiving device. The application may be an IoT application, an industrial application, or any other suitable application. An application may have a certain delay and jitter specification. The feedback may be provided in order for the transmitting device to meet the jitter and delay target or specification of the application.

Using two or more different connectivity options at the same time by the transmitting device may provide an improvement in the performance of the transmitting device. This improvement may be in the transmitting device's connectivity related performance. For example, availability and/or reliability may be improved.

The receiving device 4 may have a user interface 19 or may be connected to a user interface 19. The user interface 19 may receive user input indicating one or more of jitter and delay parameters. The input from the user interface may be provided to the controller. The controller 12 may provide an output to the user interface. For example, the controller may provide an output to the user interface where the controller is not able to achieve an application target. This is discussed in more detail later. The user interface may comprise a display which is configured to display the information received from the controller 12.

The connection with a transmitting device such as an IoT device or any other suitable device may experience a varying delay and jitter performance over time. Delay and jitter control within a required limit may be a performance characteristic required for enabling particular applications or improving the performance of particular applications.

A solution looking simply at delay control may not be suitable for jitter control or vice versa. A connection with large delays may have almost negligible jitter, while a connection with poor jitter performance may have delays within a tolerance limit of the specific application.

Some embodiments aim to ensure that jitter and/or delay are within a defined specification or desired range for a respective application.

It should be noted that some embodiments may be agnostic with respect to the communication protocol. The available connectivity options may vary. This may be due to changes in protocols and/or industry preferences.

As discussed, different applications may have different requirements. For example, different applications may have different performance requirements for meeting the quality of service (QOS) for that application. In Table 1 below, some examples of the different latency (delay), jitter and packet loss requirements of different applications are shown. In particular, Table 1 shows for different applications, the upper bounds of the latency, jitter, and packet loss metrics. If communications can be guaranteed within these bounds for a particular application, then the quality of service for the respective application may be considered to have been met. As can be seen, industrial applications related to protection and substation/factory automation have more stringent requirements as compared to voice/video calls and CCTV applications. Some industrial applications may be associated with low data rate connections.

TABLE 1

| Application | Latency (ms) | Jitter Delay (ms) | Packet Loss |
|---|---|---|---|
| Distance Protection [2] | 10 | 0.2 | 10^-9 |
| Differential Protection [2] | 10 | 0.2 | 10^-9 |
| Substation Automation [3, 4] | 50 | 5 | 10^-9 |
| Factory Automation [3, 4] | 100 | 10 | 10^-9 |
| Voice/Video call (ITU G.114 standard) [1] | 150 | 30 | 10^-2 |
| Process Automation [3, 4] | 1000 | 300 | 10^-5 |
| Building Automation [3, 4] | Seconds | NA | — |
| CCTV/Netflix [1] | NA | NA | 10^-2 |

Figure 3:
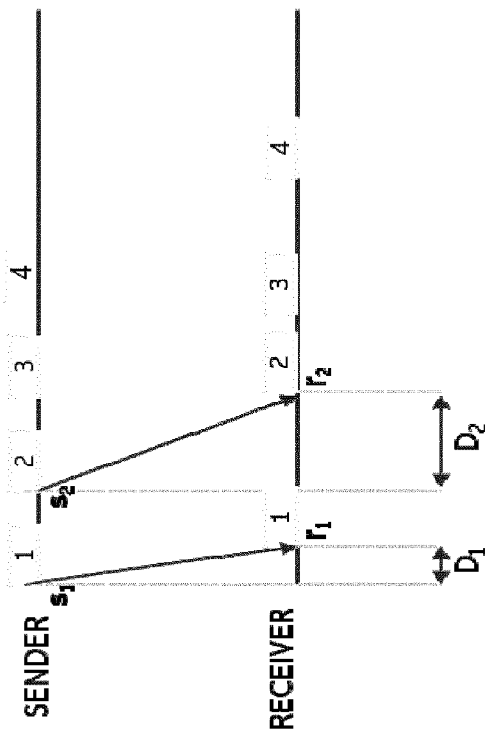
FIG. 3 schematically illustrates packet jitter.

Delay is a measure of the latency for data to travel from the transmitter to the receiver. Jitter is a measure of the difference in packet spacing at the receiving device compared to that of the transmitting device for a pair of packets. In this regard, reference is made to FIG. 3. The sender (transmitting device) sends packet 1 at time $s_1$ and packet 2 at time $s_2$. The receiving device receives packet 1 at time $r_1$ and packet 2 at time $r_2$. The time difference between $r_1$ and $s_1$ is $D_1$. The time difference represents delay. The time difference between $r_2$ and $s_2$ is $D_2$. Without jitter, $D_1$ and $D_2$ would be the same value. However, as schematically shown in FIG. 3, $D_2$ is larger than $D_1$. It is assumed in this example, that the packets are the same size. The difference between these time spaces $|(D_2-D_1)-(s_2-s_1)|$ gives the jitter delay between the two packets. For a constant stream of packets, $r_2-r_1$ may be a measure of delay.

Figure 4:
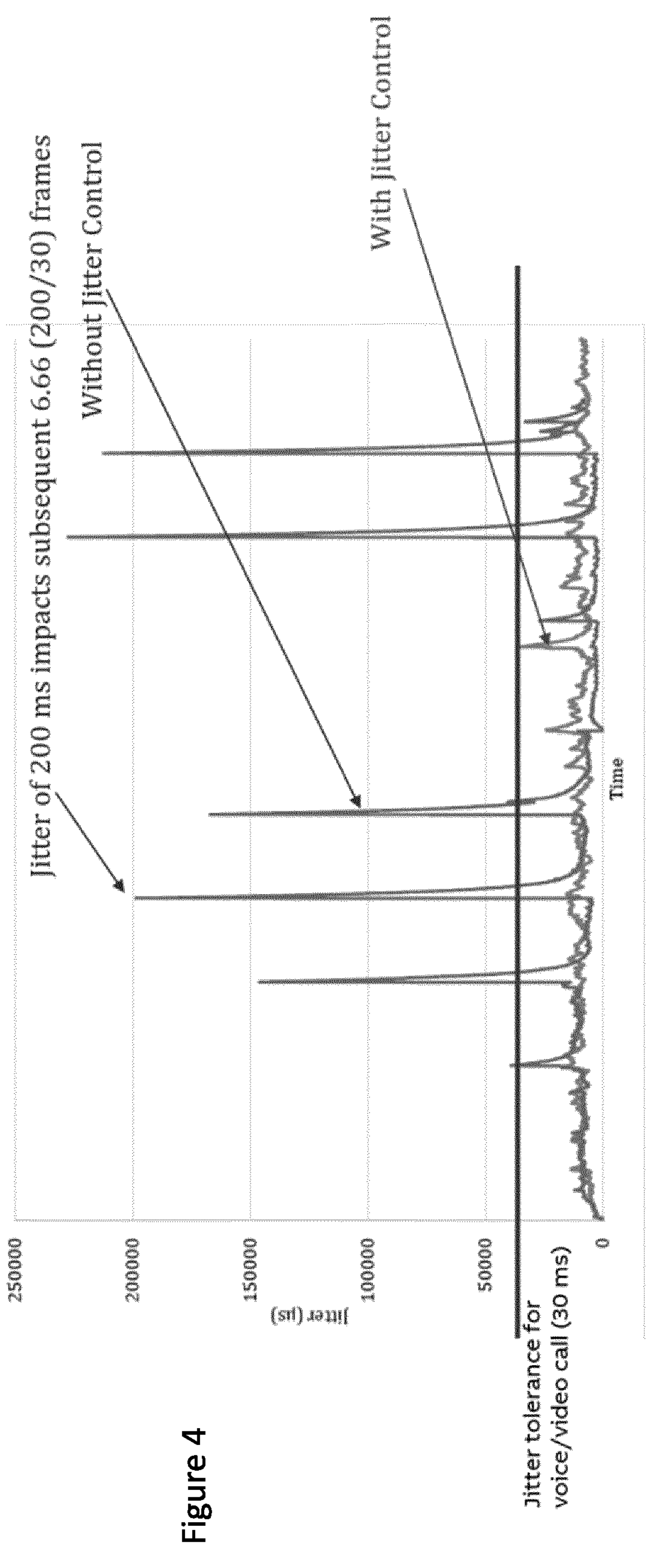
FIG. 4 shows a jitter performance for a received signal with and without the control of jitter over time.

FIG. 4 shows the jitter performance for a received signal with and without the control of jitter over time. In this example a video/voice call is being analysed for QoS. FIG.

4 shows that without any jitter control mechanism, the jitter in the received signal can be up to 4-5 times the tolerance level (30 ms) for voice/video call. A jitter spike of around 200 ms can impact the next 6-7 frames in a video call, thus resulting in poor QoS over multiple frames. With jitter control, the jitter of the received signal can be kept below the jitter tolerance level.

Some embodiments provide an approach where delay and/or jitter may be taken into account.

Reference is made to FIG. 2 which schematically shows a method provided by some embodiments. The method of some embodiments may have a training phase and an operation phase. In the training phase, delay and jitter profiles for individual connections are measured. In the example shown in FIG. 2, these are streams A to N. Embodiments may have two or more streams. The different streams are from the same transmitting device as previously discussed.

For each individual stream, a delay and jitter measure is determined. This is determined by the jitter and delay determining function 10*a* for the stream A and the jitter and delay determining function 10*b* for stream B. Stream A is received from the transmitting device and is output by the first interface 6*a* of the transmitting device. Stream B is received from the transmitting device and is output by the second interface 6*b* of the transmitting device. The determination of the delay and jitter is performed for each of the N streams. For simplicity it is assumed that there are two streams, stream A and stream B. However, it should be appreciated that embodiments may be used with more than two streams.

Example data for stream A is in Table 2 below and example data for stream B is in Table 3 below. These streams are voice/video data. However, this is by way of example only and the streams may be associated with any suitable application. The metrics for delay deviation consider the delay in excess of 150 ms which occurs between consecutive packets on a stream. For example a delay of 160 ms between two packets provides a delay deviation of 160 ms-150 ms=10 ms. The metrics for jitter deviation consider the jitter values where the jitter deviation is in excess of 30 ms. For example a jitter of 50 ms provides a jitter deviation of 50 ms-30 ms=20 ms.

It should be noted that the values used for determining jitter deviation and delay deviation may depend on the type of the application and/or the QoS requirements associated with that application. The 30 ms and 150 ms values used are by way of example only and different values may be used in other embodiments.

The time of arrival for all the packets on a stream is with respect to a reference start time T0. The same reference start time is used for both streams. This may be based on the exact time of arrival or may be measured with respect to the reference start time.

Consider packet A1. This packet arrived 180 ms after the initial time T0. The delay is the time between time T0 and the time of arrive of packet A1. The delay deviation is determined to be 30 ms—that is 180−150 ms. The jitter for the first packet is 0.

Consider packet A2. This packet arrives 390 ms after time T0. The delay is the difference between the time of arrival of packet A2 compared to the time of arrival of packet A1—that is 390 ms−180 ms=210 ms. The delay deviation is determined as for the first packet, that is the delay 210 ms−150 ms=60 ms. The jitter is the delay deviation for packet A2−the packet deviation for packet A1, that is 60−30. This give a jitter of 30. The value of the jitter deviation is the jitter determined for packet A2−30 ms=0.

This is repeated for each value. If the value of the delay deviation or the jitter deviation is less than 0, the delay deviation or the jitter deviation may be recorded as 0.

TABLE 2

Stream A over Interface 1

| Sample No | Time of Arrival | Delay (D) | Delay Deviation (>150 ms) | Jitter (J) | Jitter Deviation (>30 ms) |
|---|---|---|---|---|---|
| A1 | 180 | 180 | 30 | 0 | 0 |
| A2 | 390 | 210 | 60 | 30 | 0 |
| A3 | 570 | 180 | 30 | 30 | 0 |
| A4 | 730 | 160 | 10 | 20 | 0 |
| A5 | 920 | 190 | 40 | 30 | 0 |
| A6 | 1140 | 220 | 70 | 30 | 0 |
| A7 | 1370 | 230 | 80 | 10 | 0 |
| A8 | 1570 | 200 | 50 | 30 | 0 |
| A9 | 1795 | 225 | 75 | 25 | 0 |
| A10 | 1990 | 195 | 45 | 30 | 0 |

TABLE 3

Stream B over Interface 2

| Sample No | Time of Arrival | Delay (D) | Delay Deviation (>150 ms) | Jitter (J) | Jitter Deviation (>30 ms) |
|---|---|---|---|---|---|
| B1 | 40 | 40 | 0 | 0 | 0 |
| B2 | 120 | 80 | 0 | 40 | 10 |
| B3 | 250 | 130 | 0 | 50 | 20 |
| B4 | 300 | 50 | 0 | 80 | 50 |
| B5 | 410 | 110 | 0 | 60 | 30 |
| B6 | 450 | 40 | 0 | 70 | 40 |
| B7 | 480 | 30 | 0 | 10 | 0 |
| B8 | 530 | 50 | 0 | 10 | 0 |
| B9 | 660 | 130 | 0 | 80 | 50 |
| B10 | 710 | 50 | 0 | 80 | 50 |
| B11 | 820 | 110 | 0 | 60 | 30 |
| B12 | 970 | 150 | 0 | 40 | 10 |
| B13 | 1010 | 40 | 0 | 110 | 80 |
| B14 | 1110 | 100 | 0 | 60 | 30 |
| B15 | 1170 | 60 | 0 | 40 | 10 |
| B16 | 1300 | 130 | 0 | 70 | 40 |
| B17 | 1390 | 90 | 0 | 40 | 10 |
| B18 | 1540 | 150 | 0 | 60 | 30 |
| B19 | 1640 | 100 | 0 | 50 | 20 |
| B20 | 1790 | 150 | 0 | 50 | 20 |
| B21 | 1870 | 80 | 0 | 70 | 40 |
| B22 | 1900 | 30 | 0 | 50 | 20 |
| B23 | 1990 | 90 | 0 | 60 | 30 |

Table 2 shows that the stream A over interface 1 has a very good jitter performance but has a higher delay deviation rate. The average delay is 199 ms. The average delay deviation is about 49. The average jitter is 23.5 ms and the average jitter deviation is 0.

Table 3 shows that stream B has good delay deviation performance but poor jitter performance. The average delay is around 87 ms. The average delay deviation is 0. The average jitter is around 56 ms and the average jitter variation is around 28 ms.

These jitter and delay data determined by jitter and delay determining functions are then provided as input to the controller 12 of the receiving device. The functions provided by the controller 12 are schematically shown in FIG. 2.

The controller 12 has a combiner or data aggregator 14. The combiner 14 may combine the data from stream A with the data from stream B. In this regard, reference is made to Table 4 which shows an example of the combined data.

TABLE 4

| Unfiltered Joint Streams (A, B) | | | | | |
|---|---|---|---|---|---|
| Sample No | Time of Arrival | Delay (D) | Delay Deviation (>150 ms) | Jitter (J) | Jitter Deviation (>30 ms) |
| B1 | 40 | 40 | 0 | | |
| B2 | 120 | 80 | 0 | 40 | 10 |
| A1 | 180 | 60 | 0 | 20 | 0 |
| B3 | 250 | 70 | 0 | 10 | 0 |
| B4 | 300 | 50 | 0 | 20 | 0 |
| A2 | 390 | 90 | 0 | 40 | 10 |
| B5 | 410 | 20 | 0 | 70 | 40 |
| B6 | 450 | 40 | 0 | 20 | 0 |
| B7 | 480 | 30 | 0 | 10 | 0 |
| B8 | 530 | 50 | 0 | 20 | 0 |
| A3 | 570 | 40 | 0 | 10 | 0 |
| B9 | 660 | 90 | 0 | 50 | 20 |
| B10 | 710 | 50 | 0 | 40 | 10 |
| A4 | 730 | 20 | 0 | 30 | 0 |
| B11 | 820 | 90 | 0 | 70 | 40 |
| A5 | 920 | 100 | 0 | 10 | 0 |
| B12 | 970 | 50 | 0 | 50 | 20 |
| B13 | 1010 | 40 | 0 | 10 | 0 |
| B14 | 1110 | 100 | 0 | 60 | 30 |
| A6 | 1140 | 30 | 0 | 70 | 40 |
| B15 | 1170 | 30 | 0 | 0 | 0 |
| B16 | 1300 | 130 | 0 | 100 | 70 |
| A7 | 1370 | 70 | 0 | 60 | 30 |
| B17 | 1390 | 20 | 0 | 50 | 20 |
| B18 | 1540 | 150 | 0 | 130 | 100 |
| A8 | 1570 | 30 | 0 | 120 | 90 |
| B19 | 1640 | 70 | 0 | 40 | 10 |
| B20 | 1790 | 150 | 0 | 80 | 50 |
| A9 | 1795 | 5 | 0 | 145 | 115 |
| B21 | 1870 | 75 | 0 | 70 | 40 |
| B22 | 1900 | 30 | 0 | 45 | 15 |
| B23 | 1990 | 90 | 0 | 60 | 30 |
| A10 | 1990 | 0 | 0 | 90 | 60. |

As can be seen, Table 4 contains all the data of Tables 2 and 3. The data is ordered based on the time of arrival with respect to the reference start time T0. The delay, delay deviation, jitter and jitter deviation is then determined again for the combined data.

For example for packet B3, the delay is determined with respect to packet A1. The time of arrival of packet B3 is unchanged. The delay is now 250−180=70. The delay deviation is marked as 0 as 70−150 is less than zero. The jitter is 10 (70−60) and the jitter deviation is 0 as 10−30 is less than zero.

For the values of Table 4, the average delay is around 60 ms, the average delay deviation is 0. The average jitter is around 51 ms. The average jitter deviation may be around 27 ms.

The controller 12 is configured to determine the required optimization target. For example, is the delay to be minimized, the jitter to be minimized or are both the delay and jitter to be minimised. In some embodiments, only one of these options may be supported. In other embodiments two or all three of these options may be supported. In some embodiments, the optimization target may be dependent on the supported application. The controller may determine the supported application and based on the supported application select the required option.

The controller considers the arrival time of data streams from all the connections simultaneously, as provided by Table 4, by way of example. The controller determines a filtered time sample of the data stream that provides the required performance both in terms of jitter and delay. In this regard, reference is made to Table 5 which shows one example of a filtered time sample of the data stream which provides the desired performance. In this example, the average delay is around 83 ms and the average delay deviation is 0. In this example, the average jitter is 31 ms and the average jitter deviation is around 8 ms. As compared to the data of Table 4, the jitter deviation is improved from 27 ms to 8 ms.

TABLE 5

| Filtered Joint Streams (A, B) | | | | | |
|---|---|---|---|---|---|
| Sample No | Time of Arrival | Delay (D) | Delay Deviation (>150 ms) | Jitter (J) | Jitter Deviation (>30 ms) |
| B1 | 40 | 40 | 0 | | |
| B2 | 120 | 80 | 0 | 40 | 10 |
| A1 | 180 | 60 | 0 | 20 | 0 |
| B3 | 250 | 70 | 0 | 10 | 0 |
| B4 | 300 | 50 | 0 | 20 | 0 |
| A2 | 390 | 90 | 0 | 40 | 10 |
| B6 | 450 | 60 | 0 | 30 | 0 |
| B7 | 480 | 30 | 0 | 30 | 0 |
| B8 | 530 | 50 | 0 | 20 | 0 |
| A3 | 570 | 40 | 0 | 10 | 0 |
| B9 | 660 | 90 | 0 | 50 | 20 |
| A4 | 730 | 70 | 0 | 20 | 0 |
| B11 | 820 | 90 | 0 | 20 | 0 |
| A5 | 920 | 100 | 0 | 10 | 0 |
| B13 | 1010 | 90 | 0 | 10 | 0 |
| B14 | 1110 | 100 | 0 | 10 | 0 |
| B15 | 1170 | 60 | 0 | 40 | 10 |
| B16 | 1300 | 130 | 0 | 70 | 40 |
| B17 | 1390 | 90 | 0 | 40 | 10 |
| B18 | 1540 | 150 | 0 | 60 | 30 |
| B19 | 1640 | 100 | 0 | 50 | 20 |
| B20 | 1790 | 150 | 0 | 50 | 20 |
| B22 | 1900 | 110 | 0 | 40 | 10 |
| B23 | 1990 | 90 | 0 | 20 | 0 |

As can be seen from Table 5, some of the packets are removed—for example packet B5 is removed. This removes the relatively large jitter deviation provided by that packet. In this example, the filtered joint stream table has extracted only the time of arrivals (ToA) that results in zero delay as well as a reduced delay jitter. The corresponding data points from the respective streams can be utilized to control the transmission pattern of the data at the transmitter side. The filtering provided by the controller may depend on the delay and jitter for the received streams and the performance requirements of the application.

The receiving device provides the feedback to the transmitting device. The feedback may indicate the number of interfaces over which the transmitting device needs to transmit the data. The feedback indicates the required data pattern. For example, the feedback will indicate the first packet, second packet and fourth packet of the stream are to be sent via stream B with the third packet being sent via stream A.

Based on the feedback, the transmitting device during the operation phase, transmits the data over the connections in order to meet the jitter and delay target of the associated application. This is used in the operating phase.

The transmitting device during the operation phase may add redundancy using the packets which have been removed from Table 5. For example, for the transmitting instance associated with packet B5, the transmitting device will provide redundant data. This means that the packet either sends no data or sends a copy of data which has previously been sent to improve redundancy. The feedback from the receiving device may specify the redundancy transmitting instance and optionally the data which is to be retransmitted.

If the controller is not able to achieve the application target, then it will provide information about the missed target when compared to the specification requirements. In this case, the controller may provide recommendations on the number of additional transport mediums that would be needed for achieving the target specifications. This determination may be based on an extrapolation from the current performance of the transport mediums. This information may be provided to the transmitting device and/or to a system controller. For example, this information may be provided to a system user. This information may be provided to the system user via the user interface associated with the receiving device.

The controller may determine that the required delay and/jitter targets cannot be met with the current number of connections. The controller may provide this information to the user interface. Alternatively or additionally, the controller may determine what additional connections from the transmitter to the receiver are required. The controller may cause a message to be sent to the transmitter which causes the transmitter to use the one or more additional connections. Where one or more additional connections are provided, a training phase be triggered. An additional connection may be used before a training phase is triggered, but that additional connection may just carry redundant or repetitive data.

The controller may monitor the quality of service of each connection. Where the quality of service of a connection is declining and/or does not meet a required minimum and/or is fluctuating, the controller may be configured to provide an output indicative of this to the user interface. In some embodiments, the controller may cause a message to be sent to the transmitter which causes the transmitter to stop using a connection with a poor quality of service or to change one or more parameters associated with that connection. In some embodiments, the controller may send a message to the transmitter which causes the transmitter to stop using a connection with a poor quality and also indicates one or more other connections which should be used instead. Where a new connection is added and/or a connection is removed, a training phase may be triggered.

The data aggregator or data combiner 14 at the receiving device aggregates the data received over the different streams and then provides the aggregated data to the receiving host. The host may receive the data in real-time without any buffering operation.

In embodiments, the analytics related to jitter and delay optimization is performed at the receiver side and does not require any modification in any of the protocols. The receiving device can be configured to optimize for only delay or jitter or the combination of both.

It should be noted that the performance of embodiments may depend on one or more of the number of connections, frequency of feedback from the receiving device to the transmission connections, and the ability of the transmission connection to adapt to the required data stream transmission pattern. Thus, with more connections and/or an increased feedback frequency the transmission IoT device performance may be improved.

In some embodiments, the training may be performed on live data which is provided to the jitter and delay functions 10*a* and 10*b* and to the controller as well as to the data aggregator 14. In some embodiments, the training may be performed on an ongoing basis. For example, the training may be performed on a set of data. The feedback is used on a next set of data. A new training operation is performed on that next set of data and the feedback from that data is used on the next set of data and so on.

Depending on the application and the nature of the connections, the feedback provided for the transmission pattern across the different connections for the next set of data may provide a reduced delay, a reduced jitter or a reduced jitter and delay compared to the data on which the training is performed.

In some embodiments, the training may be based on a set of training data.

In some embodiments, the training may be periodically performed.

In some embodiments, the training may be performed again if the jitter and/or delay performance is determined to have fallen below expected levels.

Figure 5:
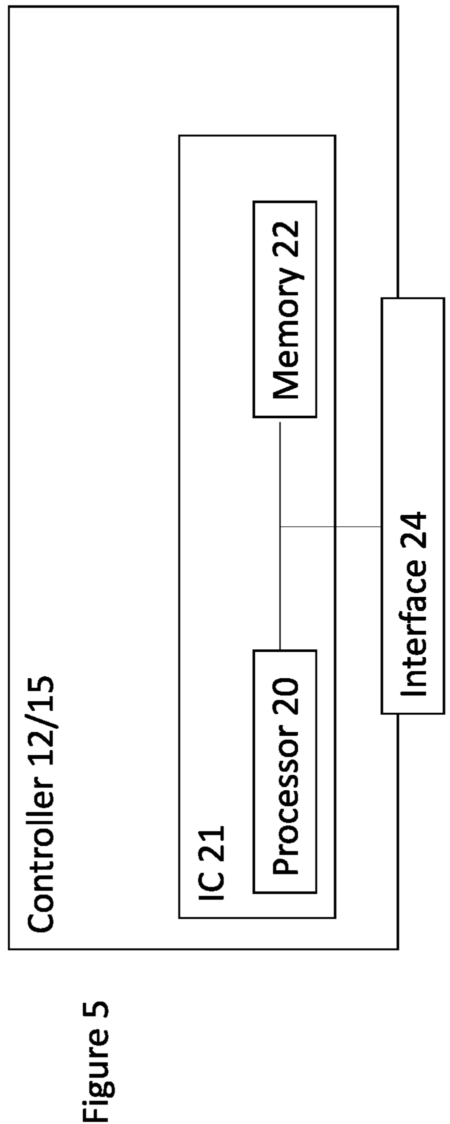
FIG. 5 shows an apparatus of some embodiments.

Reference is made to FIG. 5 which shows an apparatus providing the controller. This may be the controller 15 of the transmitting device or the controller of the receiving device 12. The controller may be provided by an apparatus comprising at least one integrated circuit (IC) 21. The at least one integrated circuit may comprises at least one processor 22 and at least one memory 22. The at least one processor and/or at least one memory may receive data via the interface 24 and/or output data via the interface. The at least one processor may be configured to run computer program code which when executed cause the previously described method to be performed. The computer program code may be stored in the at least one memory.

The controller may be part of the receiving device or provided by a separate device. The separate device may be co-located with the receiving device or connected to the receiving device via a network connection or other suitable connection.

The controller of FIG. 5 may be provided by one or integrated circuits and/or by one or more integrated circuit dies.

The apparatus of FIG. 5 may, in some embodiments when provided in the receiving device, receive the first and second streams and additionally perform the jitter and delay analysis, such as previously described.

The apparatus of FIG. 5 may, when provided in the receiving device, also provide the data aggregator in some embodiments.

It should be appreciated that in other embodiments, the controller may be provided by any circuitry and/or hardware.

In the example embodiments, reference has been made to packets. However, it should be appreciated other embodiments may be used with any other suitable units of data.

The feedback path between the receiving device and the transmitting device may be provided by any suitable connection. By way of example only, the connection may be provided by a VPN (virtual private networking) connection.

In the examples described previously, the data from each stream is first checked to determine jitter and delay. This may be useful where a first determination is made as to whether the all the streams are operating within permitted delay and/or jitter parameters. If so, no combining of the data from the two streams may be carried out.

In some embodiments, the determination of the jitter and/or delay associated with individual streams of data may be omitted and only the combined data stream is analysed to determine the delay and/or jitter information.

In the examples described previously, jitter and delay deviation are both determined. In the event that only delay is to be considered, the determination of jitter may not be carried out for the two streams.

In some embodiments, packet jitter or packet delay variation may be used as the measure of jitter. Packet jitter is a variation in latency as measured in the variability over time of the end-to-end delay across a network. Packet jitter may expressed as an average of the deviation from a mean delay.

In the examples described previously, the time of arrival may be determined with respect to a reference start point. In some embodiments, the received packets may include time stamp information. Alternatively or additionally, this time stamp information may be used to determine delay and/or jitter information.

Some embodiments may be agnostic to the protocol. Thus, some embodiments make use of the connectivity options which are supported by the transmitting device.

Some embodiments are applied at the application layer at both the transmitting device as well as the receiver end. Some embodiments may not be dependent on any lower layer or network layer configurations.

Some embodiments may be used where there are a plurality of different communication technologies available.

There are a wide range of application of embodiments.

For example, some embodiments may be used for communications in a power grid network. For example, the receiver and controller may be provided in one substation and the transmitter may be provided in another substation. In another example, the receiver and controller may be provided in a substation and a transmitter may be provided in a voltage regulator. In another example, the receiver and controller may be provided in a substation and a transmitter may be provided in a capacitor bank. In another example, the receiver and controller may be provided in a substation and a transmitter may be provided in a power distribution entity.

Some embodiments may be provided in a so-called smart-city environment. The receiver and controller may be provided in a control entity and the transmitter may be provided in an entity such as CCTV (closed circuit television), electric vehicle charging points, a sensor, and smart meters.

Some embodiments may be provided in a transport infrastructure. The receiver and controller may be provided in a control entity and the transmitter may be provided in a vehicle.

Embodiments may be provided to support any of the applications of Table 1 as well as in any other suitable scenario.

Figure 6:
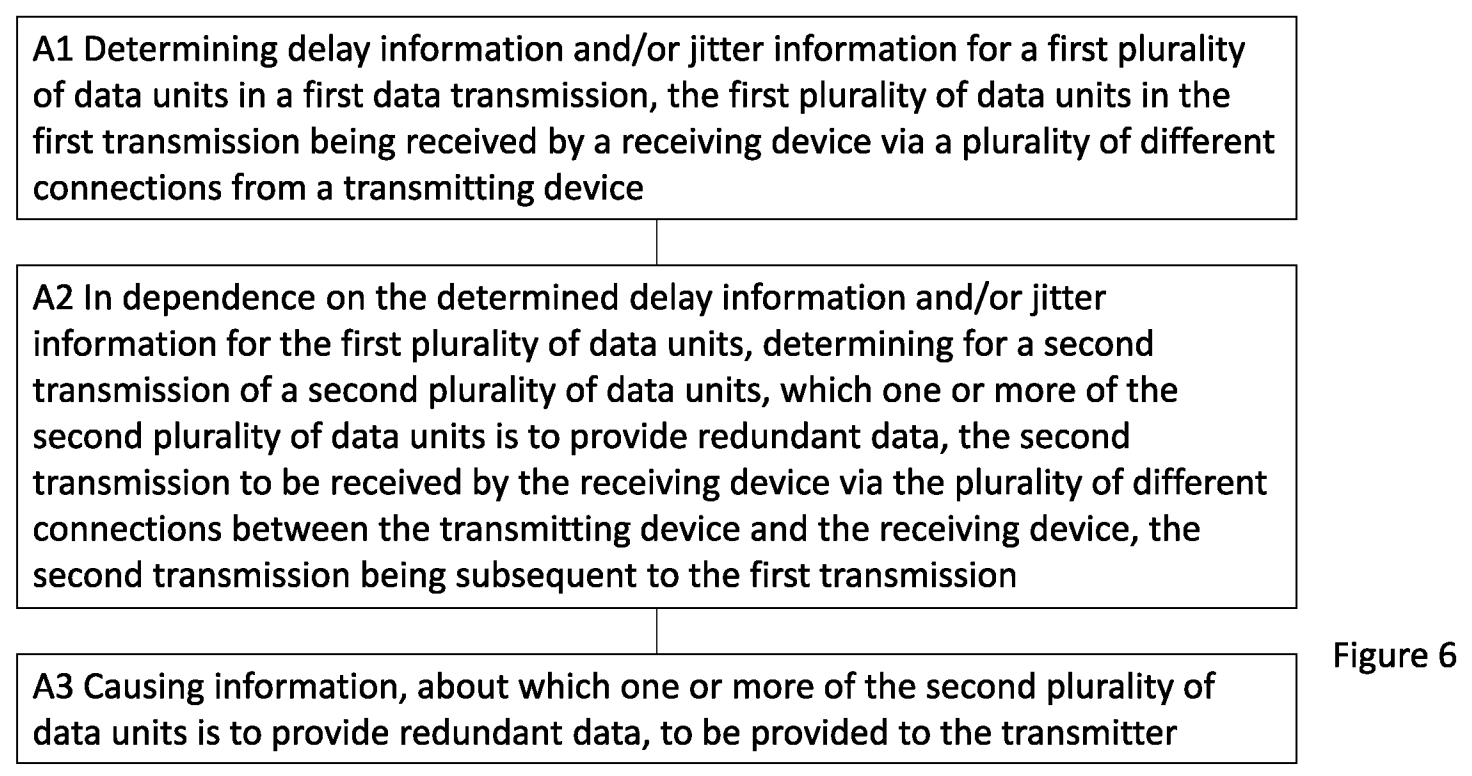

Reference is made to FIG. 6 which shows a method. The method may be performed by an apparatus. This apparatus may be as described in relation to FIG. 5. The apparatus may be provided by or in a receiving device.

The method comprises in A1 determining delay information and/or jitter information for a first plurality of data units in a first data transmission, the first plurality of data units in the first transmission being received by a receiving device via a plurality of different connections from a transmitting device.

The method comprises in A2 in dependence on the determined delay information and/or jitter information for the plurality of data units, determining for a second transmission of a second plurality of data units, which one or more of the second plurality of data units is to provide redundant data, the second transmission to be received by the receiving device via the plurality of different connections between the transmitting device and the receiving device, the second transmission being subsequent to the first transmission.

The method comprises in A3 causing information, about which one or more of the second plurality of data units is to provide redundant data, to be provided to the transmitter.

Reference is made to FIG. 7 which shows a method. The method may be performed by an apparatus. This apparatus may be as described in relation to FIG. 5. The apparatus may be provided by or in a transmitting device.

The method comprises in B1, causing a first transmission of a first plurality of data units to a receiving device from a transmitting device via a plurality of different connections.

The method comprises in B2, receiving information indicating for a second transmission of a second plurality of data units from the transmitting device to the receiving device which one or more of the second plurality of data units is to provide redundant data].

The method comprises in B3 causing the second transmission of the second plurality of data units to be transmitted to the receiving device from the transmitting device via the plurality of connections in accordance with the received information.

Some embodiments may be implemented by computer software executable by a processor, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

What is claimed is:

1. An apparatus comprising at least one integrated circuit configured to cause the apparatus to:

determine delay information and/or jitter information for a first plurality of data units in a first data transmission, the first plurality of data units in the first transmission being received by a receiving device via a plurality of different connections from a transmitting device;

in dependence on the determined delay information and/or jitter information for the first plurality of data units, determine for a second transmission of a second plurality of data units, which one or more of the second plurality of data units is to provide redundant data, the second transmission to be received by the receiving device via the plurality of different connections between the transmitting device and the receiving device, the second transmission being subsequent to the first transmission; and cause information about which one or more of the second plurality of data units is to provide redundant data, to be provided to the transmitter, wherein the at least one integrated circuit is configured to cause the apparatus to determine for the second transmission received at the receiver, a quality of service metric for one or more connections used for the second transmission, and in response to determining a decline in a respective quality of service metric for a respective connection, one or both of provide an indication of this to a user interface, or cause the transmitting device to remove the respective connection from the plurality of connections used for transmission of data units of the second transmission.

2. The apparatus as claimed in claim 1, wherein the at least one integrated circuit is configured to determine delay information and/or jitter information for the first plurality of data units in the first data transmission based on an order in which the first plurality of data units are received.

3. The apparatus as claimed in claim 1, wherein the at least one integrated circuit is configured to cause the apparatus to determine for each data unit of the first plurality of data units of the first transmission, when that data unit was received at the receiving device.

4. The apparatus as claimed in claim 3, wherein the at least one integrated circuit is configured to cause the apparatus to determine when each of the data units of first plurality of data units of the first transmission are received with respect to a common time reference.

5. The apparatus as claimed in claim 1, wherein the at least one integrated circuit is configured to cause the apparatus to determine that one or more of a delay target and a jitter target are unable to be achieved for the second transmission, and in response, provide an indication of this to a user interface.

6. The apparatus as claimed in claim 1, wherein the integrated circuit is configured to cause the apparatus to determine that one or more delay and jitter targets are unable to be achieved for the second transmission using the plurality of different connections used for the first transmission, and in response, determine one or more additional connections to be used with the plurality of different connections for the second transmission.

7. The apparatus as claimed in claim 1, wherein the at least one integrated circuit is configured to cause the apparatus to one or more of:

determine as the delay information a delay deviation representing an amount by which the delay deviates from a reference delay value; or determine as the jitter information a jitter deviation representing an amount by which the jitter deviates from a reference jitter value.

8. The apparatus as claimed in claim 1, wherein one or more the plurality of different connections is provided by one or more of:

a Bluetooth connection;
a Wi-Fi connection;
an Ethernet connection;
an optical connection; or
a mobile communication connection.

9. The apparatus as claimed in claim 1, wherein the first plurality of data units of the first transmission and the second plurality of data units of the second transmission are associated with one or more of:

an internet of things application;
an industrial application;
a protection application;
a distance protection application;
a differential protection application;
a factory application;
a substation application;
an automation application;
a substation automation application; or
a factory automation application.

10. An apparatus comprising at least one integrated circuit configured to cause the apparatus to:

cause a first transmission of a first plurality of data units to a receiving device from a transmitting device via a plurality of different connections;

receive information indicating for a second transmission of a second plurality of data units from the transmitting device to the receiving device which one or more of the second plurality of data units is to provide redundant data;

cause the second transmission of the second plurality of data units to be transmitted to the receiving device from the transmitting device via the plurality of different connections in accordance with the received information;

determine for the second transmission received at the receiver, a quality of service metric for one or more connections used for the second transmission; and in response to determining a decline in a respective quality of service metric for a respective connection, one or both of provide an indication of this to a user interface, or cause the transmitting device to remove the respective connection from the plurality of connections used for transmission of data units of the second transmission.

11. The apparatus as claimed in claim 10, wherein one or more the plurality of different connections is provided by one or more of:

a Bluetooth connection;
a Wi-Fi connection;
an Ethernet connection;
an optical connection; or
a mobile communication connection.

12. The apparatus as claimed in claim 10, wherein the first plurality of data units of the first transmission and the second plurality of data units of the second transmission are associated with one or more of:

an internet of things application;
an industrial application;
a protection application;
a distance protection application;
a differential protection application;
a factory application;
a substation application;
an automation application;
a substation automation application; or
a factory automation application.

13. A method comprising:

determining delay information and/or jitter information for a first plurality of data units in a first data transmission, the first plurality of data units in the first transmission being received by a receiving device via a plurality of different connections from a transmitting device;

in dependence on the determined delay information and/or jitter information for the first plurality of data units, determining for a second transmission of a second plurality of data units, which one or more of the second plurality of data units is to provide redundant data, the second transmission to be received by the receiving device via the plurality of different connections between the transmitting device and the receiving device, the second transmission being subsequent to the first transmission;

causing information, about which one or more of the second plurality of data units is to provide redundant data, to be provided to the transmitter;

determining for the second transmission received at the receiver, a quality of service metric for one or more connections used for the second transmission; and in response to determining a decline in a respective quality of service metric for a respective connection, one or both of providing an indication of this to a user interface, or causing the transmitting device to remove the respective connection from the plurality of connections used for transmission of data units of the second transmission.

14. A non-transitory computer-readable medium having a computer program stored thereon, the computer program comprising computer executable code which when run on at least one processor causes the method of claim 13 to be performed.

15. A method comprising:

causing a first transmission of a first plurality of data units to a receiving device from a transmitting device via a plurality of different connections;

receiving information indicating for a second transmission of a second plurality of data units from the transmitting device to the receiving device which one or more of the second plurality of data units is to provide redundant data; and causing the second transmission of the second plurality of data units to be transmitted to the receiving device from the transmitting device via the plurality of different connections in accordance with the received information;

determining for the second transmission received at the receiver, a quality of service metric for one or more connections used for the second transmission; and in response to determining a decline in a respective quality of service metric for a respective connection, one or both of providing an indication of this to a user interface, or causing the transmitting device to remove the respective connection from the plurality of connections used for transmission of data units of the second transmission.

16. A non-transitory computer-readable medium having a computer program stored thereon, the computer program comprising computer executable code which when run on at least one processor causes the method of claim 15 to be performed.

* * * * *